United States Patent
Jackson

(10) Patent No.: US 9,949,445 B1
(45) Date of Patent: Apr. 24, 2018

(54) SHRUB TRIMMING GUIDE APPARATUS

(71) Applicant: Christopher Scott Jackson, Union, KY (US)

(72) Inventor: Christopher Scott Jackson, Union, KY (US)

(*) Notice: Subject to any disclaimer, the term of this patent is extended or adjusted under 35 U.S.C. 154(b) by 131 days.

(21) Appl. No.: 15/179,428

(22) Filed: Jun. 10, 2016

Related U.S. Application Data

(60) Provisional application No. 62/173,662, filed on Jun. 10, 2015.

(51) Int. Cl.
*A01G 3/00* (2006.01)
*A01G 3/04* (2006.01)

(52) U.S. Cl.
CPC .................................. *A01G 3/0417* (2013.01)

(58) Field of Classification Search
CPC ..................................................... A01G 3/0417
USPC .......................................... 33/521, 562, 566
See application file for complete search history.

(56) References Cited

U.S. PATENT DOCUMENTS

| | | | |
|---|---|---|---|
| 975,057 A * | 11/1910 | Meeks ..................... | G01C 7/04 33/521 |
| 2,478,081 A | 8/1949 | Beets | |
| 2,679,691 A | 6/1954 | Brownell | |
| 2,883,756 A | 4/1959 | Caldwell | |
| 4,044,472 A | 8/1977 | Jue | |
| 4,989,336 A | 2/1991 | Waltrip, Jr. et al. | |
| 6,678,963 B1 | 1/2004 | Townsend | |

* cited by examiner

*Primary Examiner* — Christopher Fulton
(74) *Attorney, Agent, or Firm* — Hasse & Nesbitt LLC; Daniel F. Nesbitt

(57) ABSTRACT

A plant trimming guide apparatus, including a plurality of guide blades made of a resilient material, and a flat collar having a length, a width, an attachment surface, and made of a resilient material. Each of the plurality of guide blades has a pivot end that is secured pivotably with a common securement pin, and an opposed based end, with the plurality of base ends attached to and extending from an attachment surface of the collar, in a series along the length between the first end and the second end of the collar. Securing the first and second ends of the collar into a formed ring with the attachment surface facing outwardly causes the guide blades to extend radially from the common pivot ends and bend semi-spherically to the base ends, forming a spherical trimming guide.

20 Claims, 12 Drawing Sheets

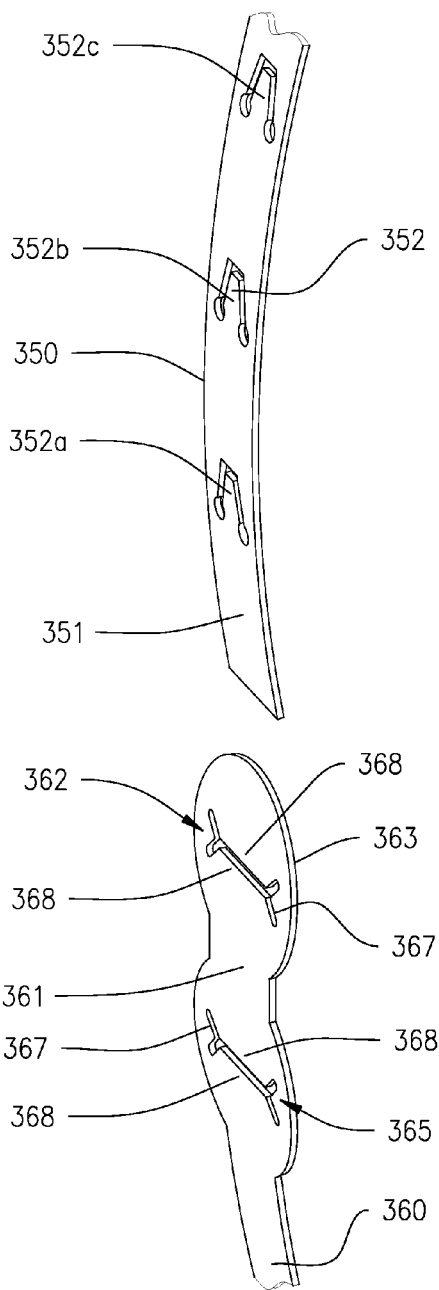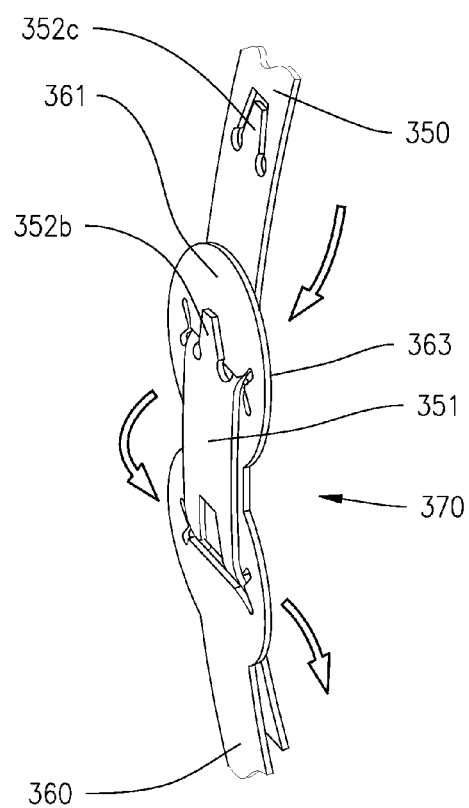
FIG. 13a
FIG. 13b

SHRUB TRIMMING GUIDE APPARATUS

CROSS-REFERENCE TO RELATED APPLICATION

This application claims the benefit of U.S. Provisional Application No. 62/173,662, the disclosure of which is incorporated herein by reference.

FIELD OF THE INVENTION

The present invention relates to a plant trimmer guide apparatus and more particularly pertains to a shrub trimming guide apparatus and method using the apparatus as a pattern for trimming of bushes and shrubs.

BACKGROUND OF THE INVENTION

The use of plant trimmer guide apparatuses are known in the prior art, and have been disclosed in U.S. Pat. Nos. 4,044,472, 2,679,691, 2,478,081, 4,989,336, 2,883,756, and 6,678,963, the disclosures of which are incorporated by reference in their entireties.

Although these apparatuses respectively fulfill their particular requirements and objectives, there remains a need for a shrub trimming guide apparatus and method using the apparatus that is uncomplicated to manufacture or use, and can be assembled quickly and effectively.

SUMMARY OF THE INVENTION

The present invention provides an improved shrub (or bush) trimming guide apparatus.

The shrub trimming guide apparatus includes a plurality of guide blades, and a base. The base comprises a collar having a length, a width, and an attachment surface. The plurality of guide blades and the flat collar are made of a resilient material. Each guide blade has a pivot end that is secured pivotably with a common securement, and an opposed base end.

In a stored position, the plurality of guide blades extend radially in an arc pattern from the common securement, with the base ends of the plurality of guide blades secured rigidly to the collar in a series along the length between the first end and the second end of the collar, and extended normally from the attachment surface of the collar.

In an assembled position, the first end and the second end of the collar are secured into a formed ring with the attachment surface facing radially outwardly. The plurality of guide blades extend radially in a circular pattern from the common securement, and bend to curve semi-spherically to the base end that is secured rigidly to the attachment surface of the formed ring, to form a spherical trimming guide. The first and second ends of the collar are secured with a securement means. The securement means can include a lateral slot on each of the opposed first and second ends and on opposite sides of the collar, for hooking one of the slots over the other slot. The securement means can also include hook and loop mechanical fastener material on the confronting surfaces of the first and second ends. The securement can also include a belt-loop attached on one of the first and second ends, and a slot and a tab in the opposed first and second ends.

In the assembled position, the formed ring is disposed surrounding the stump of a shrub to be trimmed, and the plurality of the semi-spherically bending guide blades traverse the outer periphery of the shrub.

In another aspect of the invention, the shrub trimming guide apparatus includes a plurality of adjustable-length guide blades and a base. The adjustable-length guide blade is made of a resilient material and consists of at least two overlapping and adjoining members fixed together by a fastener. The first member has a length, a pivot end that is secured pivotably with a common securement, a first overlapping end portion, and a first fastener element along the length of the first overlapping end portion. The second member has a length, a base end where the plurality of base ends attaches to and extends outwardly from the base, a second overlapping end portion, and a second fastener element along the length of the overlapping end portion.

The two members are fastened together by an adjustable fastener system, comprising a plurality of the first fastener elements and one or more of the second fastener elements. The plurality of first fastener elements are spaced along the length of the first overlapping end portion, and the one or more second fastener elements is placed or are spaced along the length of the second overlapping end portion. A user can choose to selectively adjust the length of the overlap between the overlapping end portions of the first member and the second member by moving the one or more second fastener elements to a different one of the plurality of first fastener elements to form a fastener, thereby adjusting the length of the adjustable-length guide blade. The fastener, as well as the respective first and second fastener elements, comprise a pair of complementary fastening elements that can include but are not limited to: a snap stud and a snap pocket, a hook material and a loop material such as Velcro®, a buckle and a strap, a button and a button hole, a tab and a slot, two lateral slots in the opposite side edges of the overlapping end portions of each adjacent member, or a combination thereof.

In another aspect of the invention, the adjustable fastener system is a tab-and-slot system, in which one member includes a plurality of tabs and the adjoining member includes at least one slot. Each slot is defined by an edge, disposed in a widened portion of the member, and configured to permit the overlapping end portion of the adjoining tabbed member and at least one tab thereof to pass through. The length of each of the plurality of guide blades is selectively adjusted by first threading the overlapping end portion of the tabbed member into the slot until at least one tab has been threaded through the slot, then biasing the tab out of the plane of the tabbed member, and lastly pulling the tabbed member backward relative to the slotted member until the biased tab catches or engages on the edge defining the slot. Where one guide blade member includes a plurality of tabs and an adjoining guide blade member includes a plurality of slots, the two members can be fastened by a plurality of tabs caught on the edges defining a plurality of slots.

In a further aspect of the invention, the base is a flat collar made of a resilient material, having a length, a width, and an attachment surface. The base end of each of the plurality of guide blades attaches to the attachment surface of the collar. In a stored position, the plurality of guide blades extend radially in an arc pattern from the common securement, with the base ends of the plurality of guide blades secured rigidly to the collar in a series along the length between the first end and the second end of the collar and extended outwardly from the attachment surface of the collar.

In a further aspect of the invention, in an assembled position, securing the first and second ends of the collar into a formed ring forms a spheroidal trimming guide, in which the plurality of adjustable-length guide blades extend radially in a circular pattern from the common securement, and bend to curve semi-spherically to the base end that is secured rigidly to and outwardly from the attachment surface of the formed ring.

In a further aspect of the invention, the shrub trimming guide apparatus, when assembled, rests upon the ground surrounding the stump of the shrub.

In a further aspect of the invention, the shrub trimming guide apparatus saves the user substantial time and also eliminates trimming errors.

These and other objects and features of the present invention will become apparent to one skilled in the art from the following description and accompanying drawings. It is to be understood that the drawings are designed for illustration purposes only and are not intended to define the limit or scope of the present invention.

BRIEF DESCRIPTION OF THE DRAWINGS

The invention will be better understood and objects other than those set forth above will become apparent when consideration is given to the following detailed description thereof. Such description makes reference to the annexed drawings.

FIG. 13a shows a detailed view in FIG. 12 of the two overlapping and adjoining members of an adjustable-length guide blade, releaseably fastened by a fastener that includes a pair of unidirectional tabs caught on the defined edges of a pair of slots.

FIG. 13b is a perspective view of the two members of FIG. 13a unfastened from each other.

DETAILED DESCRIPTION OF THE INVENTION

Figure 1:
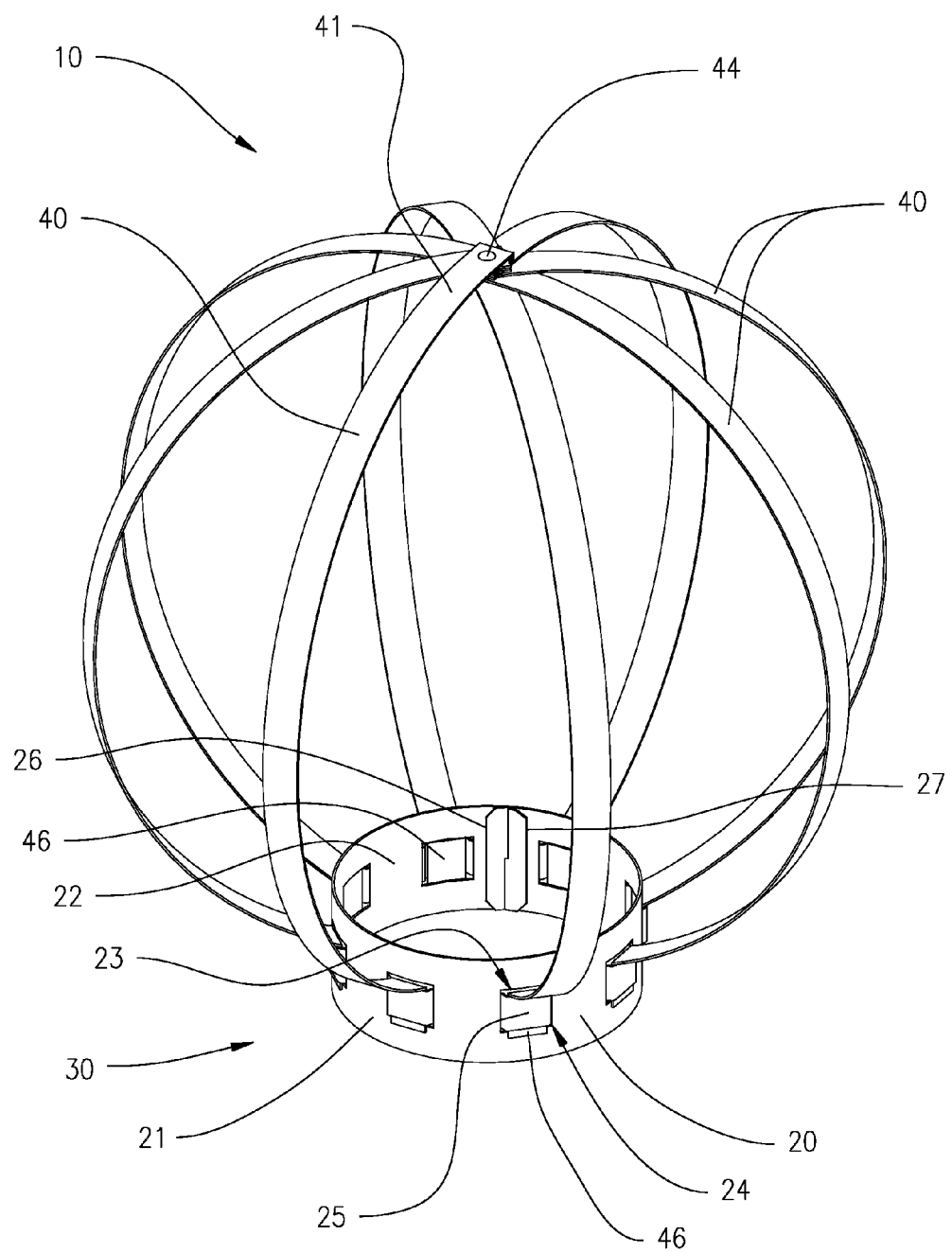
FIG. 1 is a top perspective view of a plant trimming guide apparatus according to the present invention and shown in an assembled position, surrounding a shrub.
Figure 2:
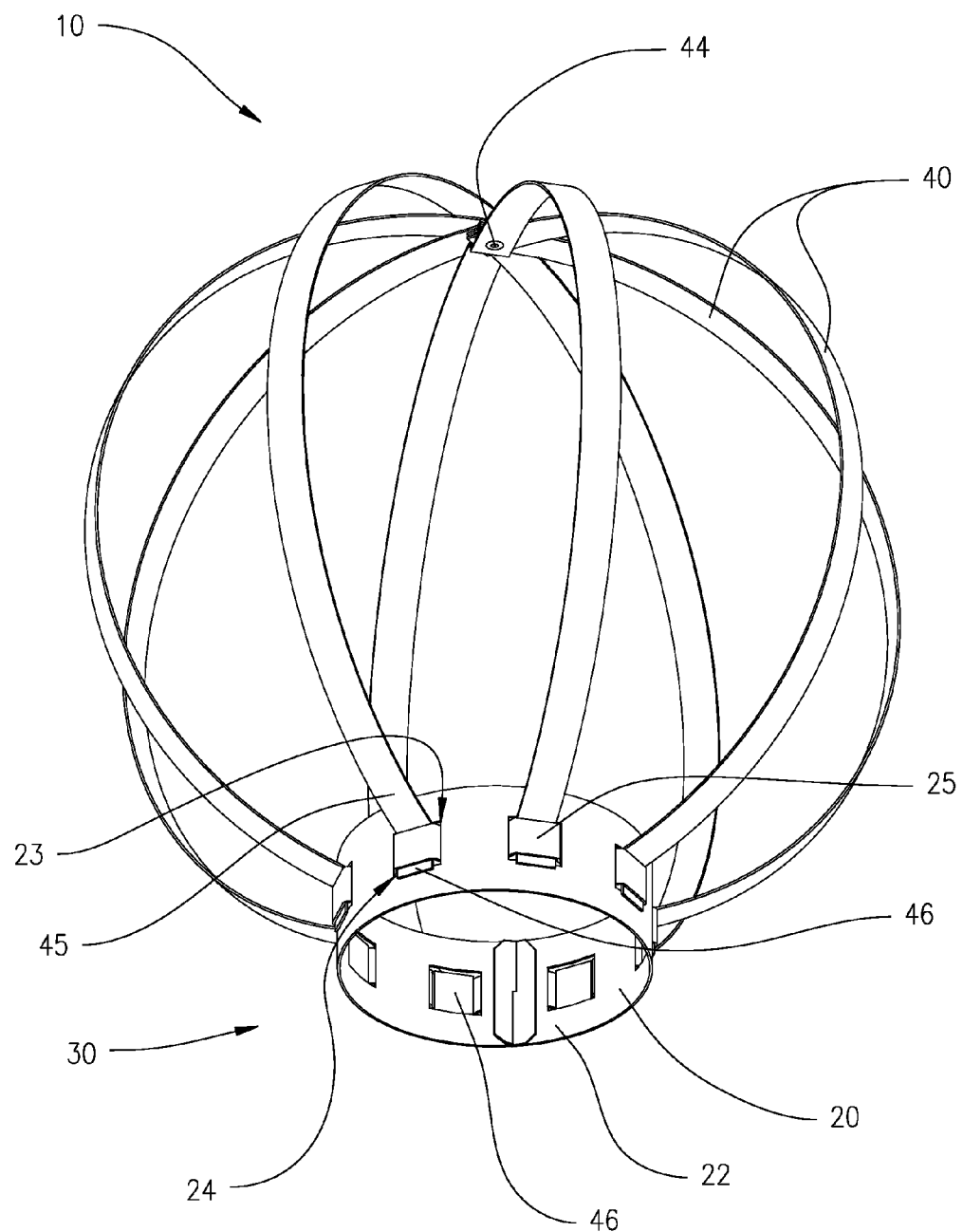
FIG. 2 is a bottom perspective view of the assembled plant trimming guide apparatus (only) of FIG. 1.
Figure 3:
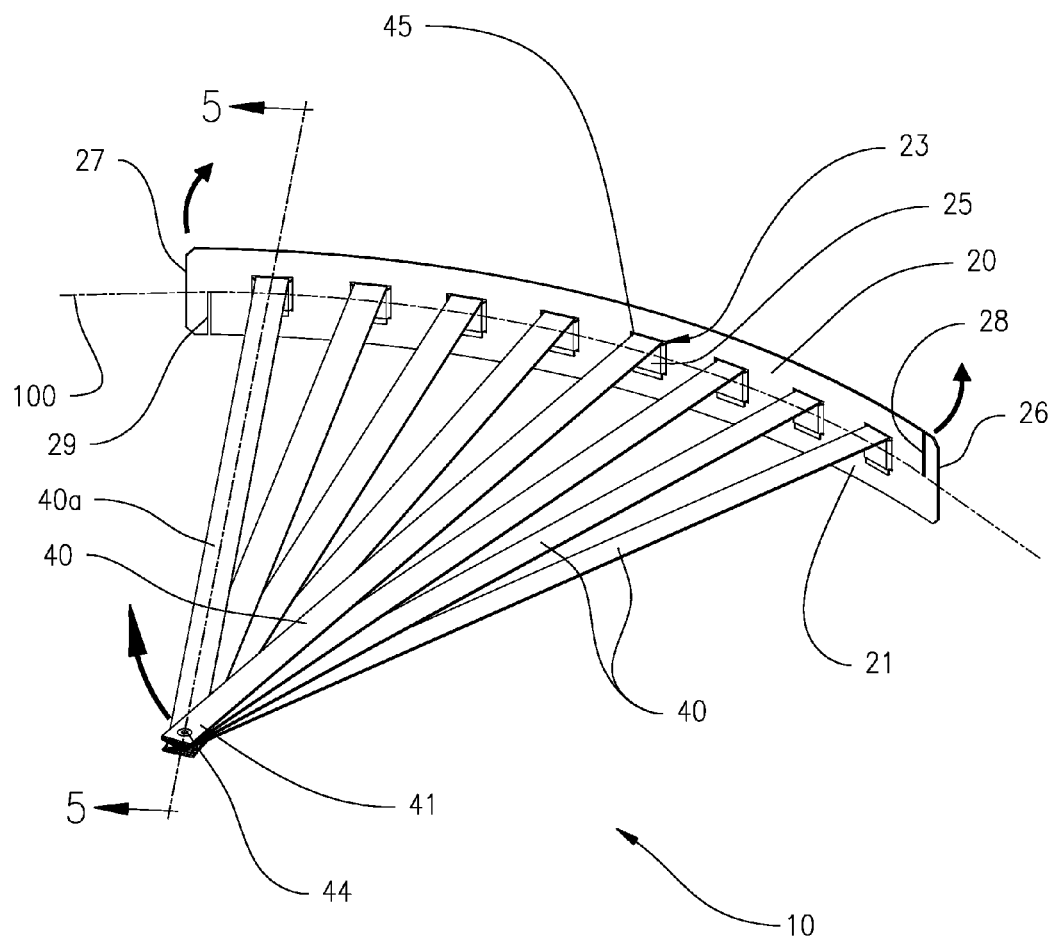
FIG. 3 is a top perspective view of the plant trimming guide apparatus in a stored position.
Figure 4:
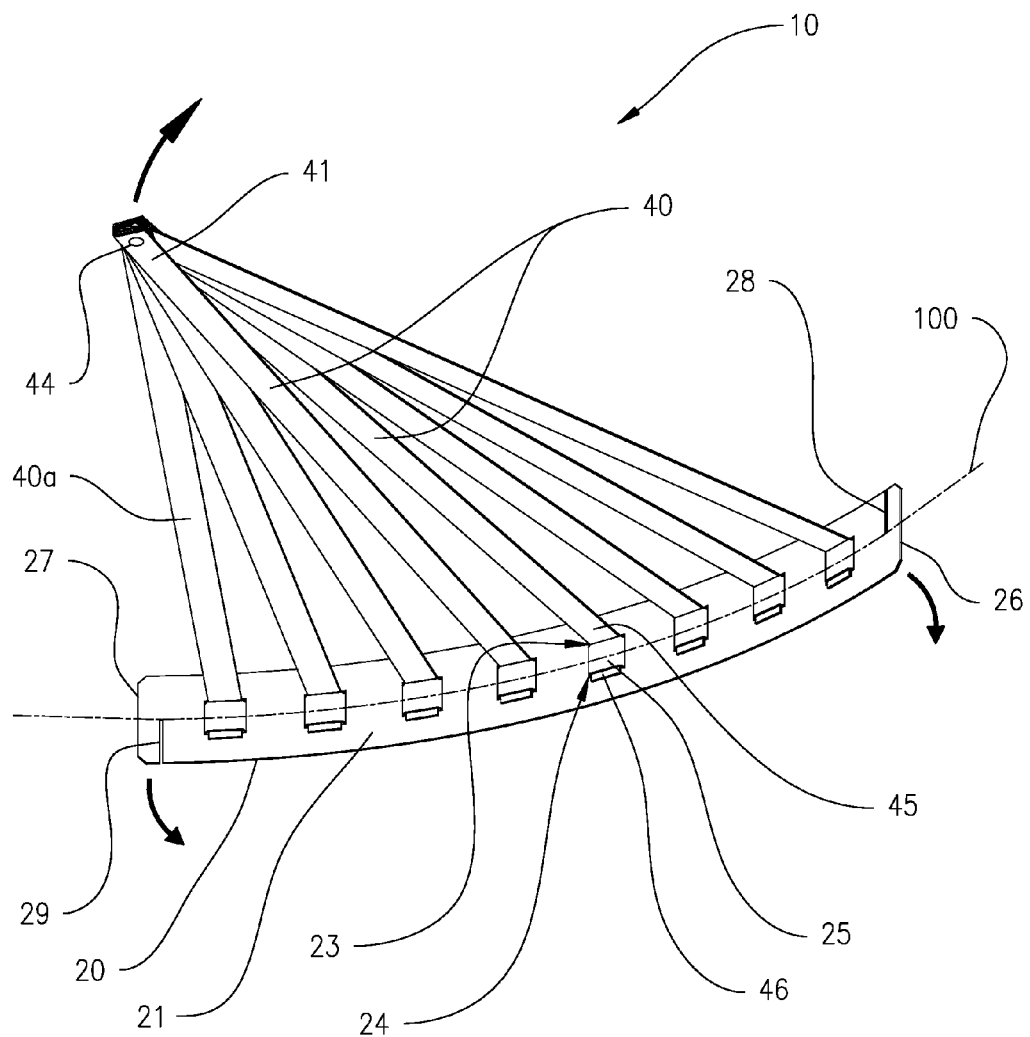
FIG. 4 is a bottom perspective view of the plant trimming guide apparatus of FIG. 3.

As illustrated in FIGS. 1 through 4, the plant trimming guide apparatus 10 generally includes a plurality of guide blades 40 and a flat collar 20. FIGS. 1 and 2 show the plant trimming guide apparatus in an assembled position, and FIGS. 3 and 4 show the plant trimming guide apparatus in a stored position.

The number of guide blades can depend upon a number of factors, including the general size of the assembled trimming guide, which is determined in part by the length of the guide blades, the width and thickness of the guide blades, and the degree of simulation desired of the trimming guide to the target geometric shape for the brush. In the illustrated trimming guide assembly, there are eight guide blades 40. The number of guide blades 40 is typically at least three, and as many as twenty. The number of guide blades sufficient for a spherical trimming shape is about six to nine guide blades. In general, an increase in the number of guide blades in an unassembled trimming guide apparatus that is configured for forming a spherical trimming shape will provide the resulting assembled trimming guide with a higher degree of simulation of the spherical shape.

Figure 7:
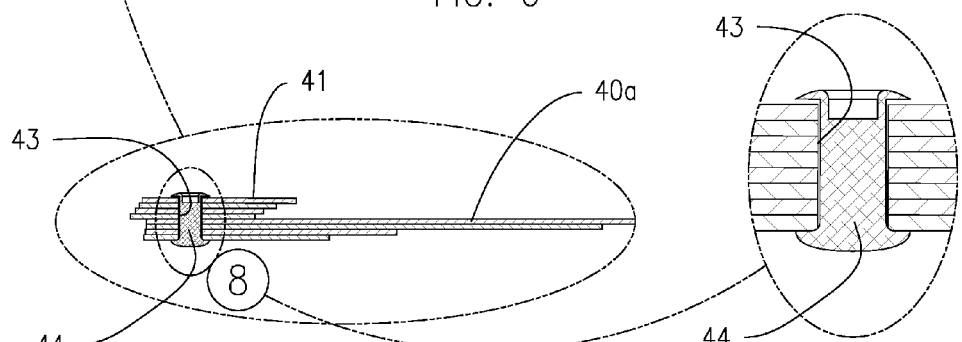
FIG. 7 shows a detailed view in FIG. 5 of the pivot end of the guide blade attached to the other pivot ends with a common pin.
Figure 8:
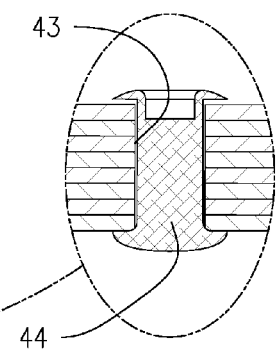
FIG. 8 shows a further detailed view in FIG. 7 of the pivot end of the guide blade attached to the other pivot ends with a common pin.

Each guide blade 40 has a length, a width, a thickness, and has a pivot end 41 and an opposed base end 45. In the illustrated embodiment, each of the plurality of guide blades is substantially the same length. The pivot end 41 includes a means for the guide blade to pivot relative to the pivot ends of the other guide blades. A typical pivot means is an aperture 43, typically circular (see FIGS. 5, 7 and 8), formed near the pivot end 41 in the middle of the material. A grommet or other circular bushing can be fit into the aperture to improve durability. A pivot pin 44 is passed through the apertures 43 of each of the plurality of guide blades 40, and secured with a fastener, which can include a rivet, a bolt, washer, and cap screw, or a cotter pin, to prevent the guide blades from falling off the end of the pivot pin. The apertures 43 can be formed with a larger diameter than the pivot pin 44, to allow friction-free pivoting, or with a diameter of or slightly smaller than that of the pivot pin, as shown in FIG.

8, to provide a friction-fit with the pivot pin 44. The common pivot means allows the plurality of guide blades to "fan out" laterally in a plane through which the pivot pin is normal.

The opposite base end 45 of each of the plurality of guide blades is secured to a collar 20. The collar 20 is a flat planar material, having a length and a width, and a thickness. The base ends 45 of the guide blades 40 attach along the length of the collar 20, at different spaced apart positions along the axis 100 of the collar 20. Typically the spacing between adjacent attachments of the base ends 45 is equal. The attachment of the base ends 45 of the guide blades 40 to the collar 20 can be in a fixed position and orientation, and be attached permanently. Alternatively, the attached base ends 45 can be in a fixed orientation, but can be removed and reinstalled in the same or a variable position. The fixed orientation can be perpendicular to the plane of the collar 20.

One method for attaching the base ends 45 permanently to the collar 20 is to mold or form a tab 46 at the distal end of the guide blade 40 at about a right angle to the length of the guide blade 40, and to weld or otherwise secure the tab 46 to the collar 20. The securement can be directly to the outer face 21 of the collar (the face from which the guide blades 40 extend), or to the inner face 22 after passing the tabs 46 through a longitudinal slot 23 (a slot 23 oriented along the axis) in the collar 20.

Figure 5:
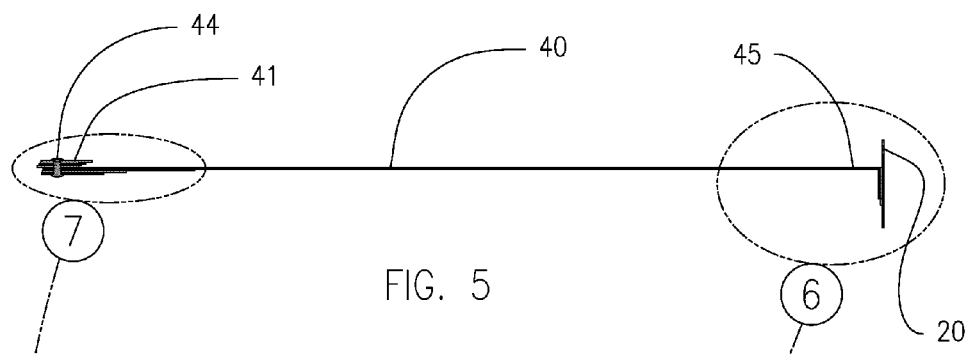
FIG. 5 is a sectional view through a guide blade of the plant trimming guide apparatus through line 5-5 of FIG. 3.
Figure 6:
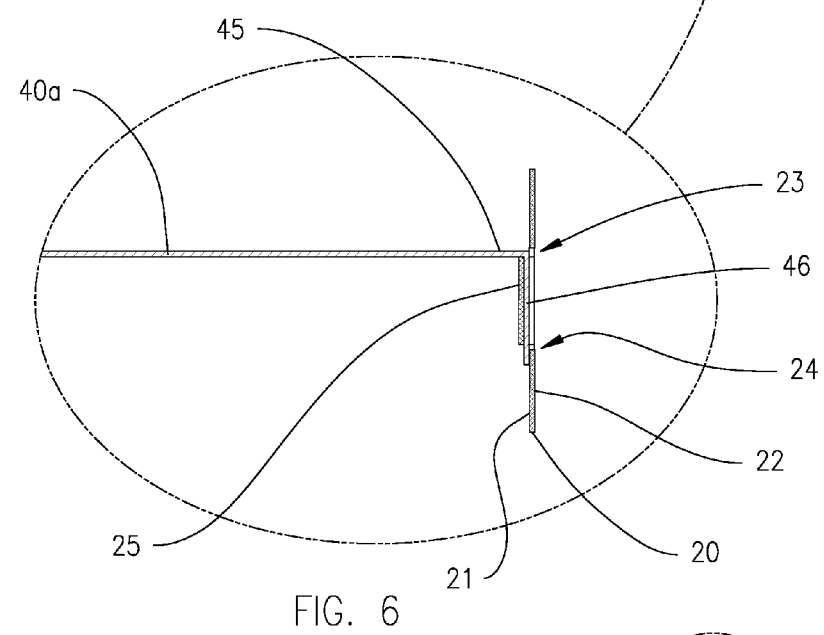
FIG. 6 shows a detailed view in FIG. 5 of the base end of the guide blade attached to the collar.

Another method for attaching the base ends 45 permanently to the collar 20 is to mold or form a tab 46 at the base end 45 at about a right angle, and to form a pair of spaced apart longitudinal slots 23, 24 in the collar 20 that define a portion of the collar in between as a lateral wall 25. FIG. 5 shows a sectional view through the end-most guide blade 40a. FIG. 6 shows the tabs 46 are laced through the first slot 23, behind the lateral wall 25, and back out through the second slot 24, as shown in FIGS. 3, 4 and 5. The laced tabs 46 can be welded or secured permanently into position, or, if desired, can be configured for removal and disassembly from the collar 20.

In a stored position shown in FIGS. 3 and 4, the plurality of guide blades 40 extend radially in an arc pattern from the common pivot, illustrated as a pivot pin 44, with the base ends 45 of the plurality of guide blades secured rigidly to the collar 20. The base ends 45 are secured in a series along the length of the collar 20, between the first end 26 and the second end 27 of the collar 20. In the illustrated embodiment, the fixed length of each of the guide blades 40 in the series causes the collar 20 to curl inwardly or concavely, toward the pivot ends. The ordering of the base ends 45 of the guide blades 40 along the length of the collar 40 can be in the same series as the ordering of stack of the pivot ends 41, or can be different, including randomly ordered. As described above, each guide blade 40 extends away from, including normally, to the outer surface 21 of the collar 20 when in a relaxed state.

In an assembled position shown in FIGS. 1 and 2, the first end 26 and the second end 27 of the collar 20 are brought together, and secured into a formed ring 30 with the outer surface 21 facing outwardly. The plurality of guide blades 40 are fixed to the outer face 21 along the circumference of the ring 30, and extend radially outwardly from the ring 30. The pivot ends 41 of the guide blades 40 are secured by a common pivot pin 44, with each guide blade 40 extending away from the pivot pin 44 in a circular pattern. The result also is that each guide blade 40 bends semi-spherically from the pivot end 41 to the base end 45, to form a spherical trimming guide 10.

The opposite first end 26 and second end 27 of the collar 20 are secured with a securement means. The securement means can include lateral slots 28, 29 on each of the opposed first end 26 and second end 27 and on opposite sides of the collar, for hooking one of the slots in one collar end, over and into the other slot in the other collar end, as shown in FIGS. 1 and 2.

The means for securing the opposite ends of the collar can also include hook and loop mechanical fastener material on the confronting surfaces of the first and second ends, or a belt-loop attached on one end of the collar, and a slot and a tab in the opposite end of the collar.

Figure 9:
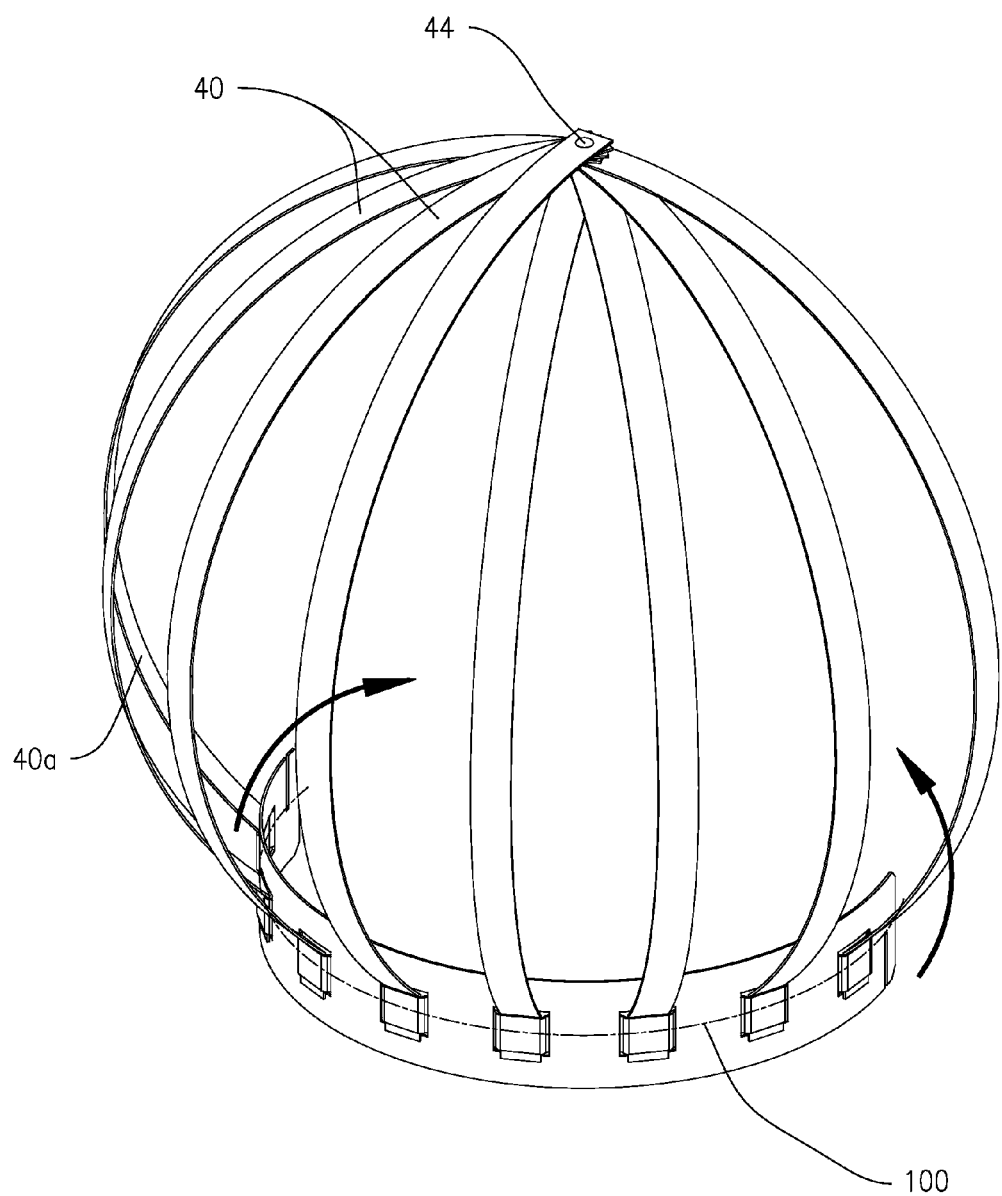
FIG. 9 shows the collar being inverted with the guide blades fanning out to form the assembled plant trimming guide apparatus.

To form the assembled trimming guide, the user grasps the opposed ends 26, 27 of the collar, and rotates the ends of the collar along the collar axis 100, as shown in FIGS. 3 and 4. As the opposed collar ends 26, 27 are rotated to about 180 degrees around the collar axis 100, the collar "inverts", and the guide blades 40 fan apart and arc outwardly, as shown in FIG. 9. Once fully inverted, the ends 26, 27 of the collar 20 can be secured together to form the ring 30, and to retain the designed shape of the trimming guide assembly 10. Alternatively, the user can grasp and arc the pivot ends upward and over the collar, so that the collar invert from concave in (in an arc in the stored position) to convex out (in the ring of the assembled position).

In the assembled position, the formed ring is disposed surrounding the stump of a shrub to be trimmed, and the plurality of the semi-spherically bending guide blades traverse the outer periphery of the shrub (as shown in FIG. 1). Typically, the formed ring can stand upon the ground around the brush, and to provide some stability during the brush trimming procedure.

The plurality of guide blades and the flat collar are made of a resilient material. Typical materials include thermoplastics and polymers. Examples of material with suitable resiliency and durability include polypropylene, high density polyethylene, low density polyethylene, polystyrene, polyester, polyamide, nylon, a bio-based polymer, such as polylacticacid (PLA), poly hydroxybutaric acid (PHA) or a starch based polymer, or other suitable synthetic or natural plastics or polymers, or combinations and laminates thereof.

Figure 10:
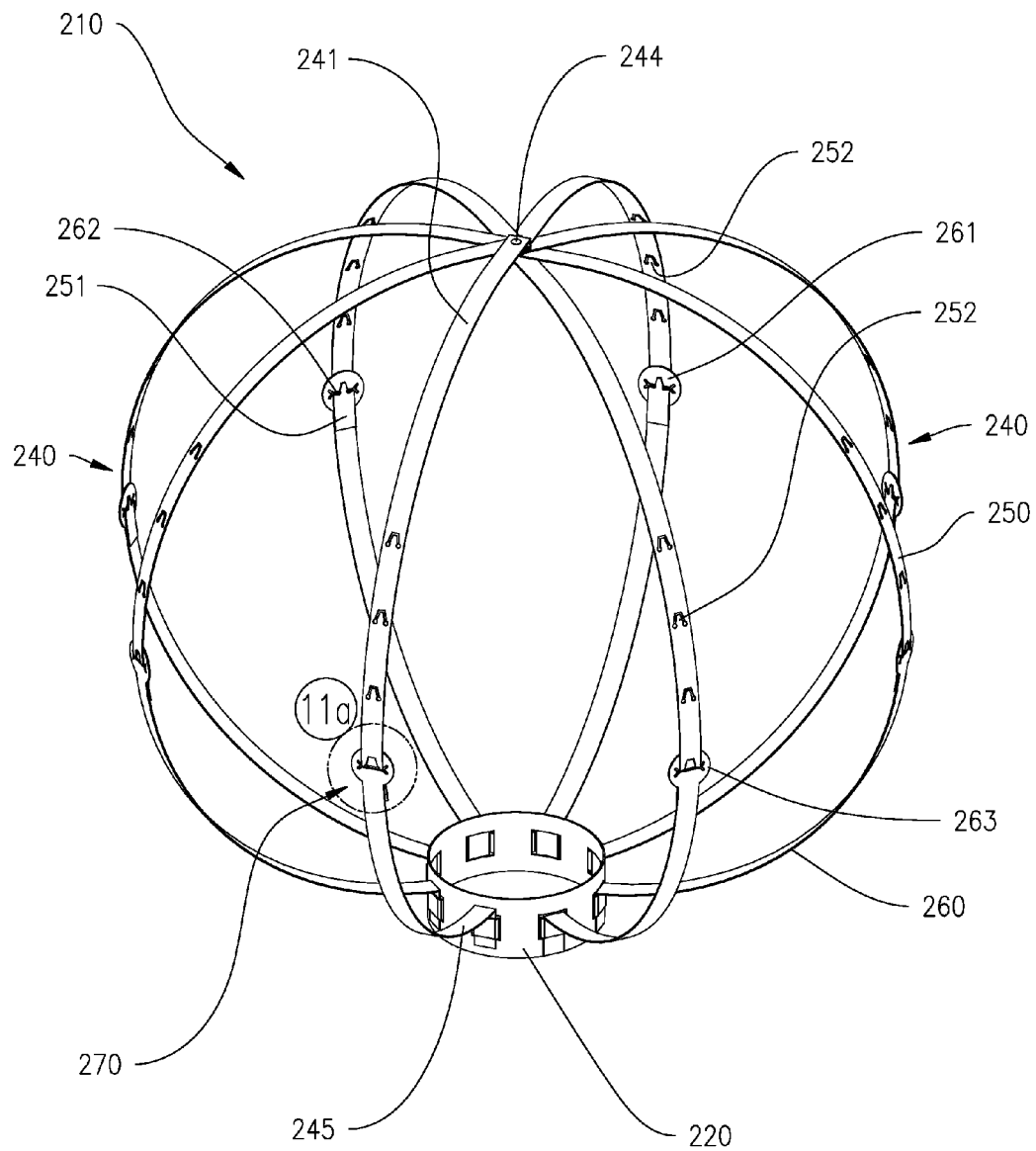
FIG. 10 is a top perspective view of an assembled spheroidal adjustable-volume plant trimming guide apparatus with adjustable-length guide blades.

In another embodiment of the invention, the plant trimming guide apparatus can include a plurality of adjustable-length guide blades, enabling the user to selectively adjust the apparatus's volume to accommodate plants of varying sizes. As illustrated in FIG. 10, the plant trimming guide apparatus 210 generally includes a plurality of adjustable-length guide blades 240 and a base 220. Each adjustable-length guide blade 240 consists of at least two overlapping and adjoining members 250 and 260. The first member 250 of each adjustable-length guide blade 240 has a length, a width, and a thickness; and includes a pivot end 241 secured pivotably with a common pivot pin 244; a first overlapping end portion 251; and at least one first fastener element 252 along the length of first overlapping end portion 251. The second member 260 of each adjustable-length guide blade 240 has a length, a width, and a thickness; and includes a base end 245, where the plurality of base ends 245 attach to and extend outwardly from base 220; a second overlapping end portion 261; and at least one second fastener element 262 along the length of the second overlapping end portion 261.

The union of at least one first fastener element 252 and at least one second fastener element 262 on each of the plurality of the adjustable-length guide blades together comprises an adjustable fastener 270. Fastener elements may be arranged anywhere on the overlapping end portion of the guide blade member, including in a series along its length. As illustrated in FIG. 10, arranging the set of first fastener elements 252 in a series along the length of the first member 250 enables the user to select which first fastener element to pair or mate with the second fastener element 262 on the second member 260, thereby enabling the user to adjust the overall length of the guide blade 240. Non-limiting examples of complementary pairs of mating fastener elements for fastening the two overlapping members together include a snap stud and a snap pocket, a hook material and a loop material such as Velcro®, a buckle and a strap, a button and a button hole, a tab and a slot, and two lateral slots on opposite sides of the overlapping end portions of each adjacent member.

In FIGS. 10 and 11a-11c, the first member 250 and second member 260 of the adjustable-guide blades 240 are releaseably fastened by a tab-and-slot fastener 270, in which the first fastener element is a tab 252 and the second fastener element is a slot 262. A plurality of tabs 252 is arranged along the length of the overlapping end portion 251 of guide blade member 250. Each tab 252 can be configured to any shape that permits the tab 252 to catch onto the edge 264 defining the slot 262 to fasten the overlapping ends of each adjustable-length guide blade 240. As a non-limiting example, FIG. 10 illustrates tabs 252 that have an approximately trapezoidal-shaped head portion, as well as a neck portion narrower than the head portion configured to facilitate biasing of the tab 252 out of the plane of first member 250. The edges of each tab 252, particularly in the neck portion, are rounded to help prevent initiation and propagation of any tears that may occur while assembling or using the plant trimmer guide apparatus 210. Each tab 252 can be formed to be in substantially the same plane as guide blade member 250. Alternatively, each tab 252 can be formed to project from a surface of first member 250, or can include hooks configured to catch against an edge 264 defining a slot 262.

Figures 11A, 11B, 11C:
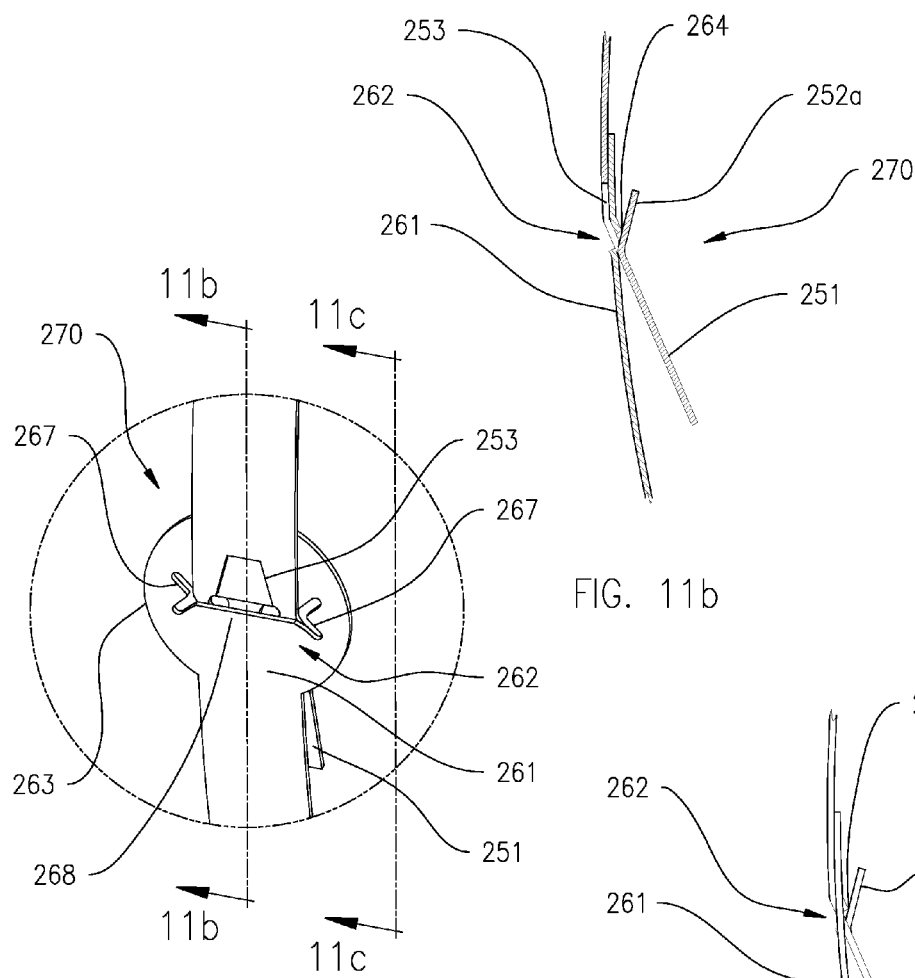
FIG. 11a shows a detailed view in FIG. 10 of two overlapping and adjoining members of an adjustable-length guide blade of the plant trimming guide apparatus, fastened by a tab-and-slot fastener.
FIG. 11b is a sectional view through the tab-and-slot fastener of FIG. 11a, taken through line 11b-11b.
FIG. 11c is a side view of the tab-and-slot fastener of FIG. 11a, through line 11c-11c.

Each slot 262 is disposed in a widened portion 263 on the overlapping end portion 261 of second member 260, and is defined by an edge 264. The widened portion 263 containing a slot 262 can be located along the length of the overlapping end portion 261, or at the terminus of overlapping end portion 261, as shown in FIG. 10. Each slot 262 can be configured to any shape that permits the user to thread overlapping end portion 251 of first member 250 and at least one tab 252 to pass through. As shown in FIGS. 10 and 11a, each slot 262 includes Y-shaped slot ends 267 on both sides of the slot. The Y-shaped slot ends define peninsular flexing flaps 268 along the top and bottom lengths of the slot 262 that permit the slot to flex when threading through and positioning overlapping end portion 251 of first member 250 to adjust the length of guide blade 240. As with tabs 252, the edges of the widened portion 263 of the second member 260 defining each slot 262 are rounded to help prevent initiation and propagation of tears during the assembly and use of the plant trimmer guide apparatus 210.

As shown in FIGS. 11a-11c, upon threading overlapping end portion 251 and at least one tab 252 through a slot 262 on overlapping end portion 261, the user can bias the tab 252 and pull the first member 250 backward relative to the second member 260, catching the tab 252 against the edge 264 of the slot 262, thereby fastening the two guide blade members 250 and 260 together. In the fastened position, tab 252 is biased against the underside of the widened portion 263 of second member 260, leaving the edge 253 to define the void on the front side of widened portion 263 left by the tab 252. In the illustrated embodiment, each adjustable-length guide blade 240 has been set to its maximum length by fastening the most distal tab 252a on first member 250 to the single slot 262 on second member 260.

Figure 12:
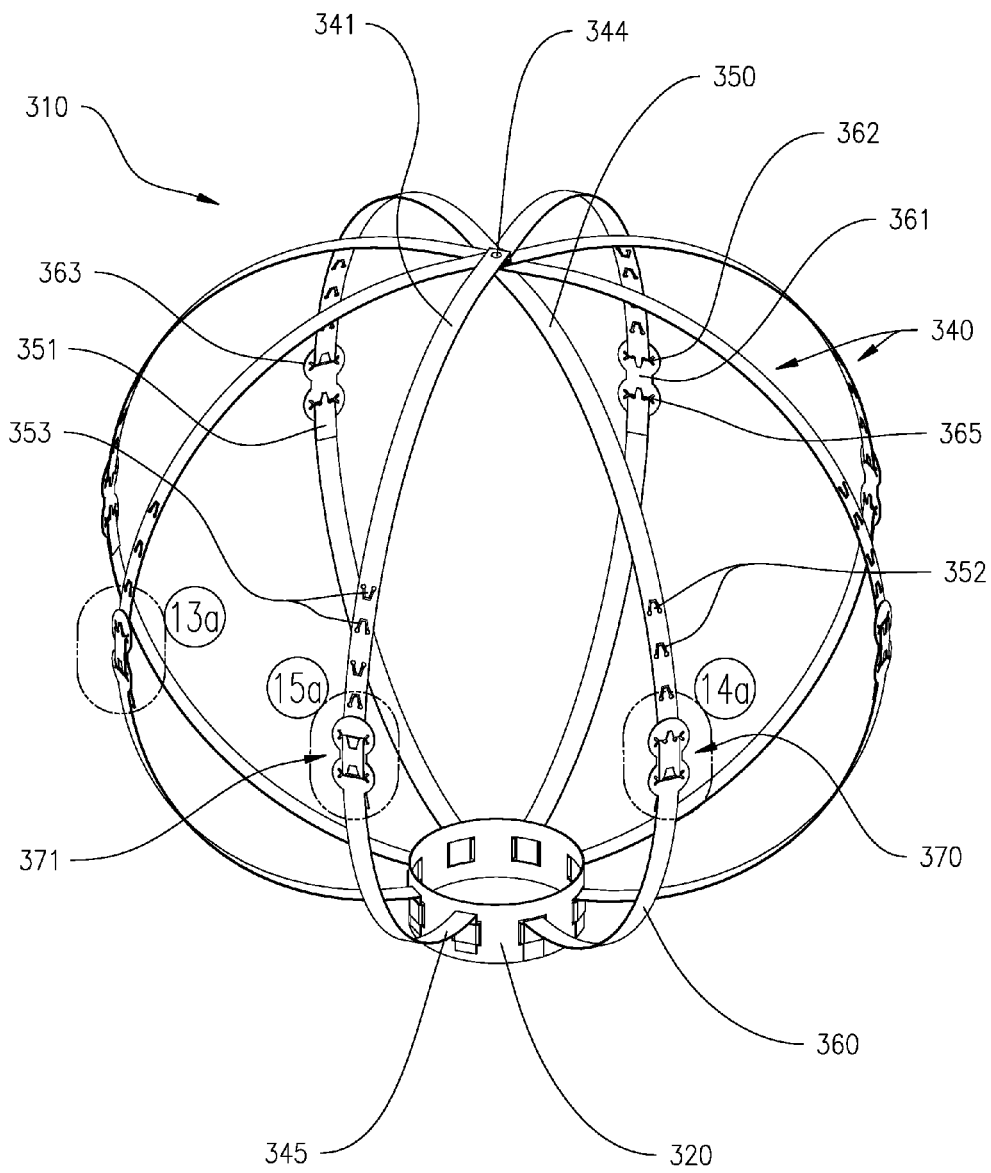
FIG. 12 is a top perspective view of an alternate embodiment of a plant trimming guide apparatus, in which two overlapping and adjoining members of each adjustable-length guide blade are fastened by a fastener that includes a plurality of tabs caught on the defined edges of a plurality of slots.
Figures 14A, 14B, 14C:
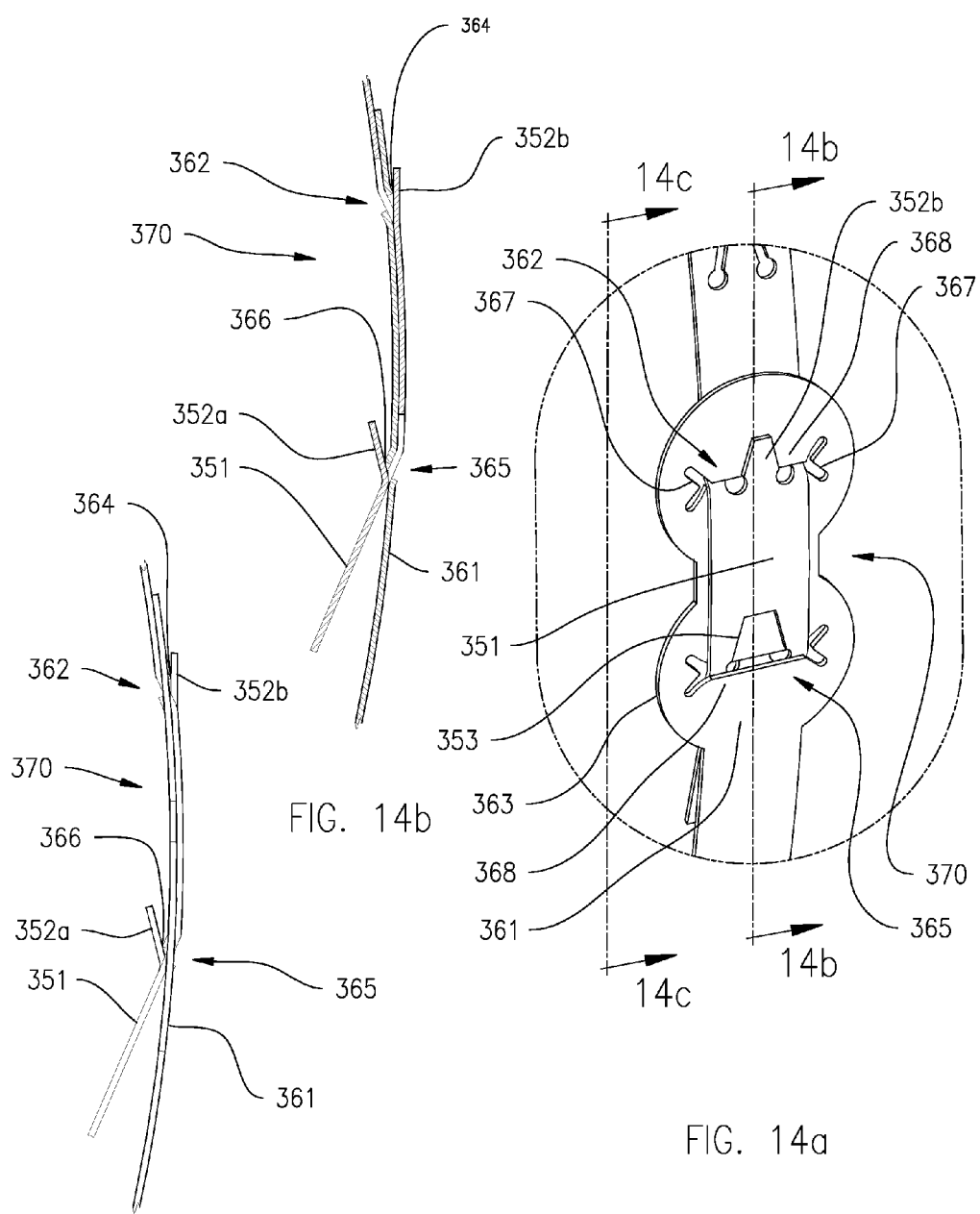
FIG. 14a shows another detailed view in FIG. 12 of the two overlapping and adjoining members of an adjustable-length guide blade of the plant trimming guide apparatus, releaseably fastened by a fastener that includes a pair of unidirectional tabs caught on the defined edges of a pair of slots.
FIG. 14b is a sectional view through the tab-and-slot fastener of FIG. 14a, taken through line 14b-14b.
FIG. 14c is a side view of the tab-and-slot fastener of FIG. 14a, taken through line 14c-14c.
Figures 15A, 15B, 15C:
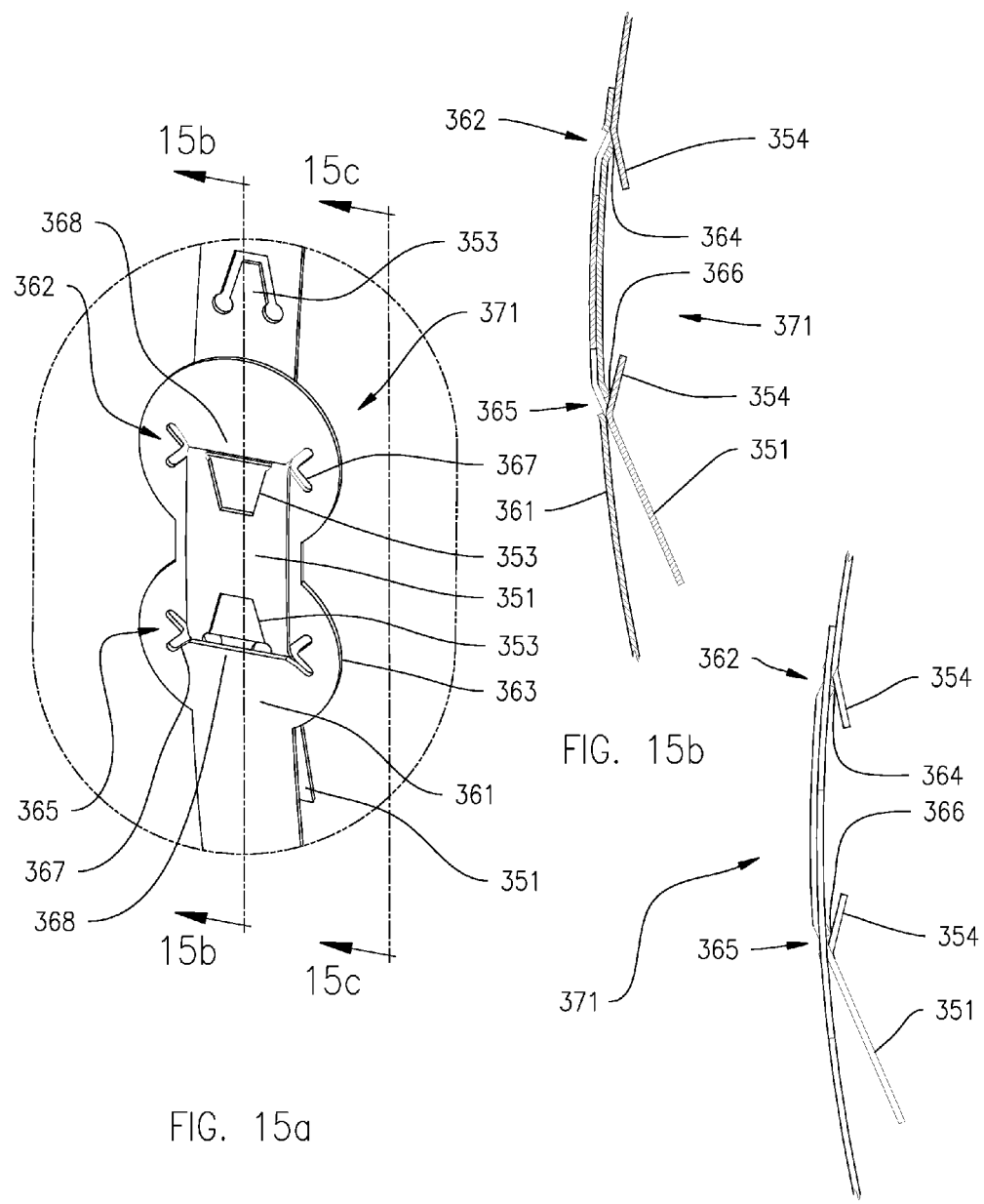
FIG. 15a shows a detailed view in FIG. 12 of two overlapping and adjoining members of another adjustable-length guide blade of the plant trimming guide apparatus, releaseably fastened by a fastener that includes a pair of oppositely, axially-directed tabs caught on the defined edges of a pair of slots.
FIG. 15b is a sectional view through the tab-and-slot fastener of FIG. 15a, taken through line 15b-15b.
FIG. 15c is a side view of the tab-and-slot fastener of FIG. 15a, taken through line 15c-15c.

In another embodiment of the invention, the fastener may comprise two or more of first fastener elements simultaneously fastened to two or more of second fastener elements. Utilizing a plurality of tabs to engage with a plurality of slots facilitates the formation of a stronger fastener that provides a more rigid guide surface against which to trim the plant, shrub, or bush. In FIG. 12 and FIGS. 13a and 13b, each of the adjustable-length guide blades 340 on the plant trimmer guide apparatus 310 further includes a first member 350 having a series of tabs 352, including tabs 352a, 352b, and 352c, oriented in the same axial direction. FIGS. 15a-15c show a first member 350 including pairs of oppositely-directed tabs 354 in overlapping end portion 351, and a second member 360 having a pair of slots 362 and 365 disposed in a widened portion 363 on the overlapping end portion 361. As in the previous embodiment, each of the plurality of adjustable-length guide blades 340 has a pivot end 341 secured pivotably with a common pivot pin 344, and a base end 345, where the plurality of base ends 345 attach to and extend outwardly from base 320.

Engaging a pair of tabs 352 with slots 362 and 365 forms fastener 370, as illustrated in FIGS. 12, 13a, and 14a-14c. As shown in FIGS. 13a and 13b, the overlapping end portion 351 of member 350 having tabs 352 facing in the same direction, is threaded from the underside of widened portion 363 up through slot 362, over the top side of the widened portion 363, and down through slot 365. The tab 352b associated with slot 362 is biased to the top side of the widened portion 363, while the tab 352a associated with slot 365 is biased to the backside of the widened portion 363, leaving the edge 353 to define the void on the front side of widened portion 363 left by the tab 352a. Pulling first member 350 backward relative to second member 360 engages each of the pair of tabs 352b and 352a with the edges 364 and 366 defining slots 362 and 365, respectively, to releaseably fasten the guide blade 340.

Similarly, engaging a pair of tabs 354 with slots 362 and 365 forms fastener 371, as illustrated in FIGS. 12 and 15a-15c. With each pair of tabs 354 facing in opposite directions, the overlapping end portion 351 of member 350 is threaded through the underside of slot 362 and the topside of slot 365. Each of the tabs 354 is biased to the underside of slot 362 and 365, leaving the edges 353 to define the voids on the front side of widened portion 363 left by the tabs 352a and 352b. Pulling the overlapping end portion 351 of member 350 toward member 360 while simultaneously pulling the pivot end 341 of member 350 away from member 360 engages tabs 354 with the edges 364 and 366 defining slots 362 and 365 respectively, releaseably fastening the guide blade 340.

In one embodiment of the invention, in an assembled position, each of the plurality of guide blades are adjusted to the same length; extend radially in a circular pattern from the common pivot ends; and bend semi-spherically to the base ends, which extend outwardly from the base, to form a spheroidal plant-trimming guide apparatus. Alternatively, each of the plurality of guide blades can be selectively adjusted to different lengths based on the desired shape of the plant to be trimmed or obstacles that need to be avoided.

In an alternative embodiment, additional guide blade members can be selectively added between the overlapping end portions of the first and second guide blade member to further lengthen the guide blade and increase the volume of the plant trimming guide apparatus.

Therefore, the foregoing is considered as illustrative only of the principles of the plant trimming guide apparatus. Further, since numerous modifications and changes will readily occur to those skilled in the art, it is not desired to limit the invention to the exact construction and operation as shown and discussed in the above figures and description. Accordingly, all suitable modifications and equivalents may be resorted to by one skilled in the art and fall within the scope of the invention.

I claim:

1. A plant trimming guide apparatus, including:
   a. a plurality of guide blades, made of a resilient material, and
   b. a base comprising a collar having a length, a width, and an attachment surface, made of a resilient material, wherein each of the plurality of guide blades has a pivot end that is secured pivotably with a common securement, and an opposed base end, the plurality of base ends attached to and extends from an attachment surface of the collar, in a series along the length between the first end and the second end of the collar.

2. The plant trimming guide apparatus according to claim 1 wherein the plurality of guide blades are substantially the same length.

3. The plant trimming guide apparatus according to claim 1 wherein, in a stored position, the plurality of guide blades extend radially in an arc pattern from the common securement, and the base ends of the plurality of guide blades secured to the collar curl the collar inwardly or concavely.

4. The plant trimming guide apparatus according to claim 3, wherein, in an assembled position, the first end and the second end of the collar are secured into a formed ring with the attachment surface facing radially outwardly, and the plurality of guide blades extend radially in a circular pattern from the common pivot ends, and bend semi-spherically to the base ends, which extend outwardly from the formed ring, to form a spherical trimming guide.

5. The plant trimming guide apparatus according to claim 4, wherein first and second ends of the collar are secured into the formed ring with a securement means.

6. The plant trimming guide apparatus according to claim 5, wherein the securement means includes lateral slots on opposite sides of the opposed first and second ends of the collar, for hooking one of the slots over the other slot.

7. The plant trimming guide apparatus according to claim 5, wherein the securement means includes a hook and loop mechanical fastener material on the respective confronting surfaces of the first and second ends.

8. A plant trimming guide apparatus, including:
   a. a plurality of guide blades, made of a resilient material; wherein each adjustable-length guide blade consists of at least two overlapping and adjoining members, including:
      i. a first member having a length, a pivot end that is secured pivotably with a common securement, a first overlapping end portion, and at least one first fastener element along the length of the first overlapping end portion; and
      ii. a second member, having a length, a base end, where the plurality of base ends attach to and extend outwardly in a series from a common base, a second overlapping end portion, and at least one second fastener element along the length of the second overlapping end portion; and
   b. an adjustable fastener comprising the first fastener element and the second fastener element, wherein at least one of the first fastener elements and at least one of the second fastener elements releaseably fasten and include a plurality of selectable fastener elements for selectively fastening the adjustable fastener to adjust the length of the overlap between the overlapping end portions of the first member and the second member, thereby adjusting the length of the adjustable-length guide blade.

9. The trimming guide apparatus according to claim 8, wherein the overlapping and adjoining end portions of each of the plurality of adjustable-length guide blades are fastened by a tab-and-slot system.

10. The trimming guide apparatus according to claim 9, wherein each slot is defined by an edge, disposed in a widened portion of the member, and configured to permit the overlapping end portion of the adjoining tabbed member and at least one tab thereof to pass through.

11. The trimming guide apparatus according to claim 10, wherein the length of each of the plurality of adjustable-length guide blades is selectively adjusted by threading the overlapping end portion of the tabbed member into the slot until at least one tab has been threaded through the slot, biasing the tab out of the plane of the tabbed member, and pulling the tabbed member backward relative to the slotted member until the biased tab catches on the edge defining the slot.

12. The trimming guide apparatus according to claim 11, wherein the first fastener element is a tab and the second fastener element is a slot.

13. The trimming guide apparatus according to claim 12, wherein the length of the first overlapping portion of each of the plurality of adjustable-length guide blades includes at least two tabs in a series, and the second overlapping end portion of each of the plurality of adjustable-length guide blades includes at least two slots in a series.

14. The trimming guide apparatus according to claim 13, wherein the first member and the second member of each of the plurality of adjustable-length guide blades are releaseably fastened by at least two tabs caught on the defined edges of at least two slots.

15. The trimming guide apparatus according to claim 14, wherein, in an assembled position, the plurality of adjustable-length guide blades extend radially in a circular pattern from the common pivot ends, and bend semi-spherically to the base ends, which extend outwardly from the base, to form a spheroidal trimming guide.

16. The trimming guide apparatus according to claim 15, wherein the base comprises a collar made of a resilient material, having a length, a width, and an attachment surface upon which each of the plurality of adjustable-length guide blades is attached.

17. The trimming guide apparatus according to claim 16, wherein the first end and the second end of the collar are secured into a formed ring with the attachment surface facing outwardly, by a securement means.

18. The trimming guide apparatus according to claim 17, wherein the securement means includes lateral slots on opposite sides of the opposed first and second ends of the collar, for hooking one of the slots over the other slot.

19. The trimming guide apparatus according to claim 18, wherein the securement means includes a hook and loop mechanical fastener material on the respective confronting surfaces of the first and second ends.

20. The trimming guide apparatus according to claim 16, wherein the base end of each of the plurality of guide blades is integrally attached to the attachment surface of the collar.

* * * * *